United States Patent
Kagan et al.

(10) Patent No.: US 12,212,212 B2
(45) Date of Patent: Jan. 28, 2025

(54) SUPERCONDUCTING GENERATOR INCLUDING VACUUM VESSEL MADE OF MAGNETIC MATERIAL

(71) Applicant: General Electric Company, Schenectady, NY (US)

(72) Inventors: Alexander Kagan, Albany, NY (US); David Allan Torrey, Ballston Spa, NY (US); Michael Parizh, Niskayuna, NY (US); Tiziana Bertoncelli, Munich (DE); Minfeng Xu, Ballston Lake, NY (US)

(73) Assignee: GENERAL ELECTRIC RENOVABLES ESPAÑA, S.L., Barcelona (ES)

( * ) Notice: Subject to any disclaimer, the term of this patent is extended or adjusted under 35 U.S.C. 154(b) by 227 days.

(21) Appl. No.: 17/625,123

(22) PCT Filed: Jul. 9, 2019

(86) PCT No.: PCT/US2019/040986
§ 371 (c)(1),
(2) Date: Jan. 6, 2022

(87) PCT Pub. No.: WO2021/006881
PCT Pub. Date: Jan. 14, 2021

(65) Prior Publication Data
US 2022/0320990 A1    Oct. 6, 2022

(51) Int. Cl.
*H02K 55/00*    (2006.01)
*F03D 9/25*    (2016.01)
(Continued)

(52) U.S. Cl.
CPC ............... *H02K 55/00* (2013.01); *F03D 9/25* (2016.05); *H02K 3/02* (2013.01); *H02K 5/10* (2013.01);
(Continued)

(58) Field of Classification Search
CPC .......... H02K 55/00; H02K 3/02; H02K 7/183; H02K 2213/03; H02K 5/02; H02K 7/1838; Y02E 40/60
(Continued)

(56) References Cited

U.S. PATENT DOCUMENTS 5,973,582 A * 10/1999 Havens .............. G01R 33/3873
324/318
6,762,517 B2    7/2004 Wang et al.
(Continued)

FOREIGN PATENT DOCUMENTS

CN    1385950 A    12/2002
CN    108370211 A    8/2018
(Continued)

OTHER PUBLICATIONS

PCT International Search Report & Written Opinion Corresponding to PCT/US2019/040986 on Jan. 28, 2020.
(Continued)

*Primary Examiner* — Charles Reid, Jr.
(74) *Attorney, Agent, or Firm* — Dority & Manning, P.A.

(57) ABSTRACT

A superconducting generator including an armature configured to be rotated via a shaft and a stationary field disposed concentric to and radially outward from the armature. The stationary field including a superconducting field winding and a vacuum vessel having an inner wall of one of a non-magnetic material or a paramagnetic material facing the armature, an opposed outer wall of a ferromagnetic material and a plurality of sidewalls coupling the inner wall and the
(Continued)

opposed outer wall. The superconducting field winding is disposed in the vacuum vessel. A wind turbine and method are additionally disclosed. The wind turbine includes a rotor having a plurality of blades. The wind turbine further includes a shaft coupled to the rotor. Moreover, the wind turbine includes the superconducting generator coupled to the rotor via the shaft.

20 Claims, 5 Drawing Sheets

(51) Int. Cl.
*H02K 3/02* (2006.01)
*H02K 5/10* (2006.01)
*H02K 7/18* (2006.01)

(52) U.S. Cl.
CPC ........ *H02K 7/183* (2013.01); *F05B 2220/706* (2013.01)

(58) Field of Classification Search
USPC .............................. 290/1 R, 5, 39, 44, 49, 55
See application file for complete search history.

(56) References Cited

U.S. PATENT DOCUMENTS

| | | | |
|---|---|---|---|
| 7,053,740 B1 | 5/2006 | Laskaris et al. | |
| 7,498,814 B1 | 3/2009 | Huang et al. | |
| 2004/0041409 A1* | 3/2004 | Gabrys | H02K 19/103 290/55 |
| 2010/0244596 A1 | 9/2010 | Husband et al. | |
| 2013/0002052 A1* | 1/2013 | Hunter | H02K 33/16 310/12.25 |
| 2016/0276918 A1 | 9/2016 | Morrison | |
| 2020/0169158 A1 | 5/2020 | Buhrer et al. | |
| 2021/0270239 A1* | 9/2021 | Torrey | F03D 9/25 |
| 2021/0273547 A1* | 9/2021 | Torrey | H02K 11/012 |

FOREIGN PATENT DOCUMENTS

| | | |
|---|---|---|
| EP | 1959548 A1 | 8/2008 |
| EP | 3384585 A1 | 10/2018 |
| KR | 101497825 B1 | 3/2015 |
| WO | WO2009068844 A1 | 6/2009 |

OTHER PUBLICATIONS

Marston et al., Conceptual Design of a Superconducting Magnet for a 200 MWeMHD Engineering Test Facility, IEEE Transactions on Magnetics, vol. 19, Issue 3, May 1983, pp. 867-871.

Chinese Office Action, Jul. 31, 2024.

* cited by examiner

SUPERCONDUCTING GENERATOR INCLUDING VACUUM VESSEL MADE OF MAGNETIC MATERIAL

BACKGROUND

Embodiments of the present disclosure generally relate to a superconducting generator, and in particular, to a superconducting generator including a vacuum vessel at least partially constructed of a magnetic material and a wind turbine including the superconducting generator.

Conventional machines such as a conventional superconducting generator typically includes a stationary field and an armature. The armature includes a traditional ferromagnetic core and armature winding disposed on the traditional ferromagnetic core. The armature winding is generally formed using conventional materials, for example, copper or aluminum. Whereas, the stationary field includes a superconducting field winding formed of superconducting wires that support very high current densities without incurring any dissipation. The conventional superconducting generator, when operated, and more particularly, the superconducting wires generate very high magnetic field, for example, on the order of 7 Tesla or larger due to the high current densities in the superconducting field winding.

Typical high temperature superconducting field windings are formed of super-conducting materials that are brittle and must be cooled to a temperature at or below a critical temperature, e.g., 27 Kelvin, to achieve and maintain superconductivity. The superconducting field windings may be formed of a high temperature super-conducting material, such as a BSCCO ($Bi_2Sr_2Ca_{n-1}Cu_nO_{2n+4+x}$) based conductor.

The superconducting field windings generally must be thermally isolated to keep cooling power within practical limits. A vacuum vessel is commonly used to help create thermal isolation of the superconducting field windings. The vacuum prevents heat from the warm rotor core from being transferred by convection to the superconducting field windings. The vacuum further provides for cooling of the superconducting field windings with an associated cooling system. The vacuum provides complete enclosure of the superconducting field windings therein and implies associated air-tight seals be maintained on the assembly that includes the field coils and the associated support structure and cooling equipment.

A typical vacuum container surrounding the superconducting field windings is formed of a costly and temperature insensitive material, such as a non-magnetic stainless steel so that it does not influence the magnetic performance of the superconducting field windings. As such, the overall cost of the superconducting generator is high and it requires the inclusion of magnetic shielding to reduce the fringe magnetic field outside the vacuum vessel, or it will leave some higher magnetic fringe field outside the vacuum vessel.

Accordingly, there is a long felt need for a superconducting generator that incorporates a more cost-effective means for providing a vacuum vessel about the superconducting field windings, a means for enhancing the magnet field near the ends of the superconducting field windings and passively providing some level of magnetic shielding. The needed generator should be highly reliable, have a reasonable size and weight, and comprised of cost effective materials to reduce the overall cost of the generator and allow for economical shipping and installation.

BRIEF DESCRIPTION

In accordance with one embodiment of the present disclosure, a superconducting generator is presented. The superconducting generator includes an armature configured to be rotated via a shaft and a stationary field disposed concentric to and radially outward from the armature. The stationary field includes a superconducting field winding and a vacuum vessel including an inner wall facing the armature, an opposed outer wall and a plurality of sidewalls coupling the inner wall and the outer wall. The superconducting field winding is disposed in the vacuum vessel. The inner wall is comprised of one of a non-magnetic material or a paramagnetic material. The opposed outer wall is comprised of a ferromagnetic material.

In accordance with one embodiment of the present disclosure, a wind turbine is presented. The wind turbine includes a rotor comprising a plurality of blades, a shaft coupled to the rotor and a superconducting generator coupled to the rotor via the shaft. The stationary field includes a superconducting field winding and a vacuum vessel including an inner wall comprised of one of a non-magnetic material or a paramagnetic material facing the armature, an opposed outer wall comprised of a ferromagnetic material and a plurality of sidewalls coupling the inner wall and the opposed outer wall. The superconducting field winding is disposed in the vacuum vessel.

In accordance with yet another embodiment of the present disclosure, a method is presented. The method includes operating a wind turbine having a superconducting generator including an armature having an armature winding and a stationary field having a superconducting field winding. The superconducting field winding is disposed in a vacuum vessel constructed having an inner wall comprised of one of a non-magnetic material or a paramagnetic material and an opposed outer wall comprised of a ferromagnetic material. The superconducting field winding further disposed concentric to and radially outward from the armature winding. The vacuum vessel provides increased magnetic flux near the superconducting field winding ends and provides partial magnetic shielding.

These and other features, aspects and advantages of the present invention will become better understood with reference to the following description and appended claims. The accompanying drawings, which are incorporated in and constitute a part of this disclosure, illustrate embodiments of the invention and, together with the description, serve to explain the principles of the invention.

BRIEF DESCRIPTION OF THE DRAWINGS

A full and enabling disclosure of the present disclosure, including the best mode thereof to one skilled in the art, is set forth more particularly in the remainder of the disclosure, including reference to the accompanying figures, in which.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein. Corresponding reference characters indicate corresponding parts throughout the several views of the drawings.

DETAILED DESCRIPTION

In an effort to provide a concise description of these embodiments, all features of an actual implementation may not be described in the specification. It should be appreciated that in the development of any such actual implementation, as in any engineering or design project, numerous implementation-specific decisions may be made to achieve the developer's specific goals such as compliance with system-related and business-related constraints.

Unless defined otherwise, technical and scientific terms used herein have the same meaning as is commonly understood by one of ordinary skill in the art to which this specification belongs. The terms "first", "second", and the like, as used herein do not denote any order, quantity, or importance, but rather are used to distinguish one element from another. Also, the terms "a" and "an" do not denote a limitation of quantity, but rather denote the presence of at least one of the referenced items. The use of "including," "comprising" or "having" and variations thereof herein are meant to encompass the items listed thereafter and equivalents thereof as well as additional items. The terms "connected" and "coupled" are not restricted to physical or mechanical connections or couplings, and can include electrical or magnetic connections or couplings, whether direct or indirect. The term "paramagnetic" as used herein refers to a material that is weakly attracted by the poles of a magnet but does not retain any permanent magnetism. The term "mild carbon steel" and "mild or low carbon steel" as used herein refers to a material that contains a small percentage of carbon, typically on the order of 0.04% to 0.30% carbon, and more particularly, on the order of 0.06% to 0.30% carbon. Additional elements may be added or increased to achieve desired properties. The term "stationary field" as used herein refers to a field generating components that remains stationary during operation, such as the superconducting field winding, and the enclosure in which the field generating components are housed.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances, the modified term may sometimes not be appropriate, capable, or suitable.

As will be described in detail hereinafter, various embodiments of a superconducting generator is presented. The superconducting generator includes an armature configured to be rotated via a shaft. The superconducting generator further includes a stationary field disposed concentric to and radially outward from the armature. The stationary field includes a plurality of superconducting field winding. To achieve thermal insulation of the superconducting field windings, the superconducting field windings are housed in a vacuum vessel, sometimes referred to as a field coil outer vacuum container (OVC). The vacuum vessel forms a portion of a cryostat and serves to thermally insulate the superconducting coils of the non-rotating superconducting field windings so that they may be cooled to near absolute zero, e.g., to 10 Kelvin (K) and preferably to 4K. The superconducting generator is anticipated for use in a wind turbine.

The wind turbine includes a rotor having a plurality of blades. The wind turbine further includes a shaft coupled to the rotor. Moreover, the wind turbine includes the superconducting generator coupled to the rotor via the shaft. In alternate embodiments, the superconducting generator is anticipated for use propulsion systems, magnetic levitation devices for train transportation and nuclear fusion, or the like, and is not intended to be limiting to wind turbine implementations.

Figure 1:
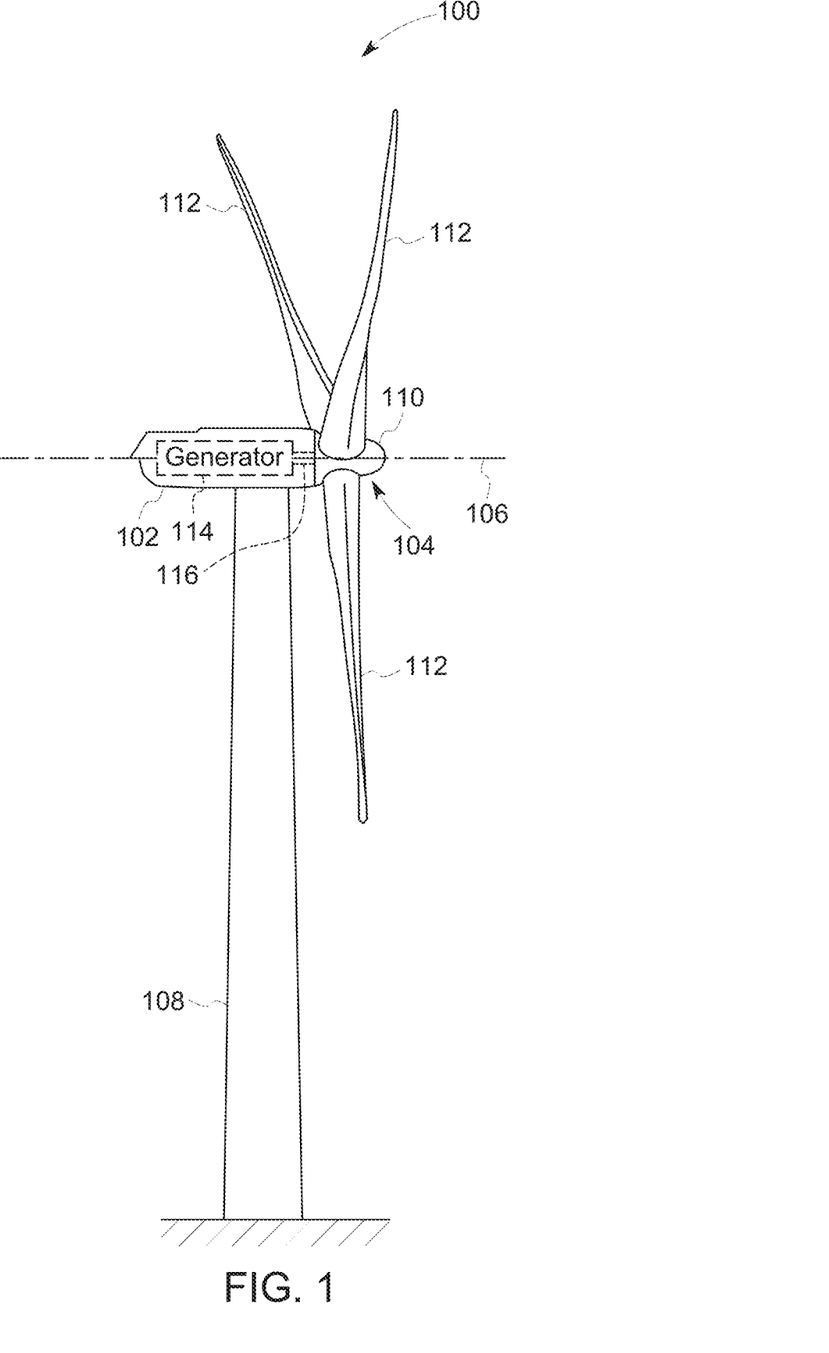
FIG. 1 is a schematic diagram of an example wind turbine, in accordance with one or more embodiments of the present disclosure.

Referring now to FIG. 1, a schematic diagram of an example wind turbine 100 is presented, in accordance with one embodiment of the present specification. The wind turbine 100 may be configured to generate electrical power using wind energy. The wind turbine 100 described and illustrated in the embodiment of FIG. 1 includes a horizontal-axis configuration. However, in some embodiments, the wind turbine 100 may include, in addition or alternative to the horizontal-axis configuration, a vertical-axis configuration (not shown). The wind turbine 100 may be coupled to, such as, but not limited to, a power grid, for receiving electrical power therefrom to drive operation of wind turbine 100 and/or its associated components and/or for supplying electrical power generated by the wind turbine 100 thereto. The wind turbine 100 may be coupled to an electrical load (not shown) to supply electrical power generated by the wind turbine 100 thereto to the electrical load.

The wind turbine 100 may include a body 102, sometimes referred to as a "nacelle," and a rotor 104 coupled to the body 102. The rotor 104 is configured to rotate with respect to the body 102 about an axis of rotation 106. In the embodiment of FIG. 1, the nacelle 102 is shown as mounted on a tower 108. However, in some other embodiments, the wind turbine 100 may include a nacelle that may be disposed adjacent to the ground and/or a surface of water.

The rotor 104 may include a hub 110 and a plurality of blades 112 (sometimes referred to as "airfoils") extending radially outwardly from the hub 110 for converting wind energy into rotational energy. Although the rotor 104 is described and illustrated herein having three blades 112, the rotor 104 may have any number of blades 112. The rotor 104 may have blades 112 of any shape and may have blades 112 of any type and/or any configuration, whether such shape, type, and/or configuration is described and/or illustrated herein.

In some embodiments, the nacelle 102 may house, fully or partially, one or more of a superconducting generator 114, and a shaft 116. The superconducting generator 114 may be coupled to the rotor 104 via the shaft 116 and configured to be operated via the rotor 104. For example, rotations of the rotor 104 due to the wind energy in turn cause a rotary element (e.g., an armature) of the superconducting generator 114 to rotate via the shaft 116. In some embodiments, the shaft 116 may also include a gear box (not shown). In certain embodiments, use of the gear box may increase the operating speed of the superconducting generator 114 and reduce the torque requirement for a given power level. The presence or absence of the gearbox is immaterial to the embodiments of the superconducting generator 114 described in the present specification.

The superconducting generator 114 is configured to generate electrical power based at least on the rotations of the armature (shown in FIGS. 2 and 3) relative to the stationary field. In accordance with some embodiments described herein, the superconducting generator 114 may be configured to produce increased magnitudes of electrical power in comparison to traditional generators. The superconducting generator 114 may be implemented in the form of a synchronous generator. The superconducting generator 114 will be described in greater details in conjunction with FIGS. 2-4.

Figure 2:
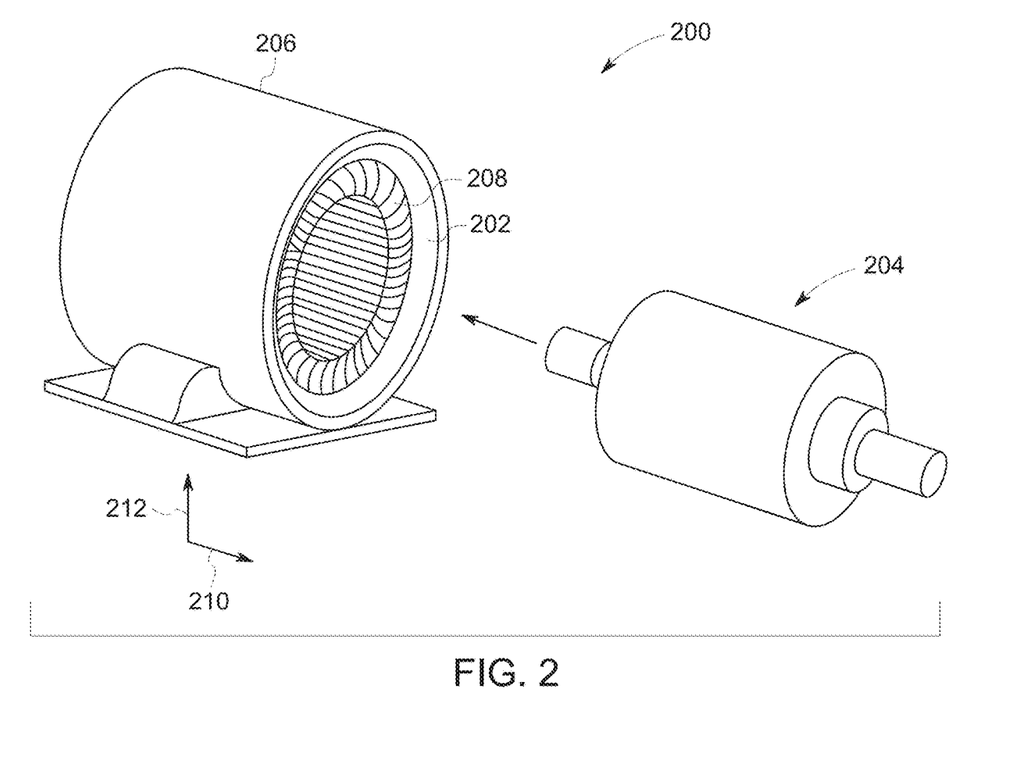
FIG. 2 is a schematic diagram of an electric machine, for example, a superconducting generator, in accordance with one or more embodiments of the present disclosure.

In FIG. 2, a schematic diagram of an electric machine, for example, a superconducting generator 200 is presented, in accordance with an embodiment of the present disclosure. The superconducting generator 200 may be representative of one embodiment of the superconducting generator 114 used in the wind turbine 100 of FIG. 1. Without limiting the scope of the present application, as previously asserted, the superconducting generator 200 may be used in any application other than wind turbines. By way of a non-limiting example, the superconducting generator 200 depicted in FIG. 2 is a radial field electric machine. Moreover, although the superconducting generator 200 is shown as the electric machine of FIG. 2, in some other embodiments, the electric machine of FIG. 2 may also be a superconducting motor. Reference numerals 210 and 212 respectively represent an axial direction and a radial direction of the superconducting generator 200.

As depicted in FIG. 2, the superconducting generator 200 includes a stationary field 202 and an armature 204 disposed in a housing 206. By way of example, in some embodiments, when the superconducting generator 200 is deployed as the superconducting generator 114 in the wind turbine 100, the armature 204 may be coupled to the rotor 104 of the wind turbine 100 via the shaft 116 or via both the shaft 116 and a gear box. The armature 204 may be configured to be rotated via the shaft 116. Due to the rotations of the armature 204, the superconducting generator 200 may generate electrical power by virtue of the voltage induced in armature windings as they move past the magnetic field established by at least one superconducting field winding.

An exploded view of the superconducting generator 200 is depicted in FIG. 2 to separately show the stationary field 202 and an armature 204. The stationary field 202 includes at least one longitudinally extending, race-track shaped superconducting field winding 208 (also identified by reference numeral 308 in FIG. 3) that is configured to generate a magnetic field oriented in the radial direction 212 of the superconducting generator 200. The superconducting field winding may be alternatively a saddle-shape or have some other shape that is suitable for a particular implementation. The armature 204 may include an armature winding (identified by reference numeral 320 in FIG. 3). In some embodiments, the armature winding 320 is non-superconducting winding.

The stationary field 202 is disposed concentric to and radially outward from the armature 204. The stationary field 202 is maintained at a temperature, adequate for keeping the stationary field 202 superconducting, generally much lower than the temperature of the armature 204. Typically, to enable the superconducting property of the stationary field 202, the stationary field 202 is maintained within a cryogenic range of about 4 Kelvin if the superconducting field winding 208, 308 is composed of low temperature superconducting material; if the superconducting field winding 208, 308 is composed of high temperature superconducting material, the stationary field 202 is maintained at a temperature of about 30 Kelvin. By way of non-limiting example, the low temperature superconducting material may include an alloy of niobium and tin, or an alloy of niobium and titanium. By way of non-limiting example, the high temperature superconducting material may include yttrium barium copper oxide (YBCO).

Figure 3:
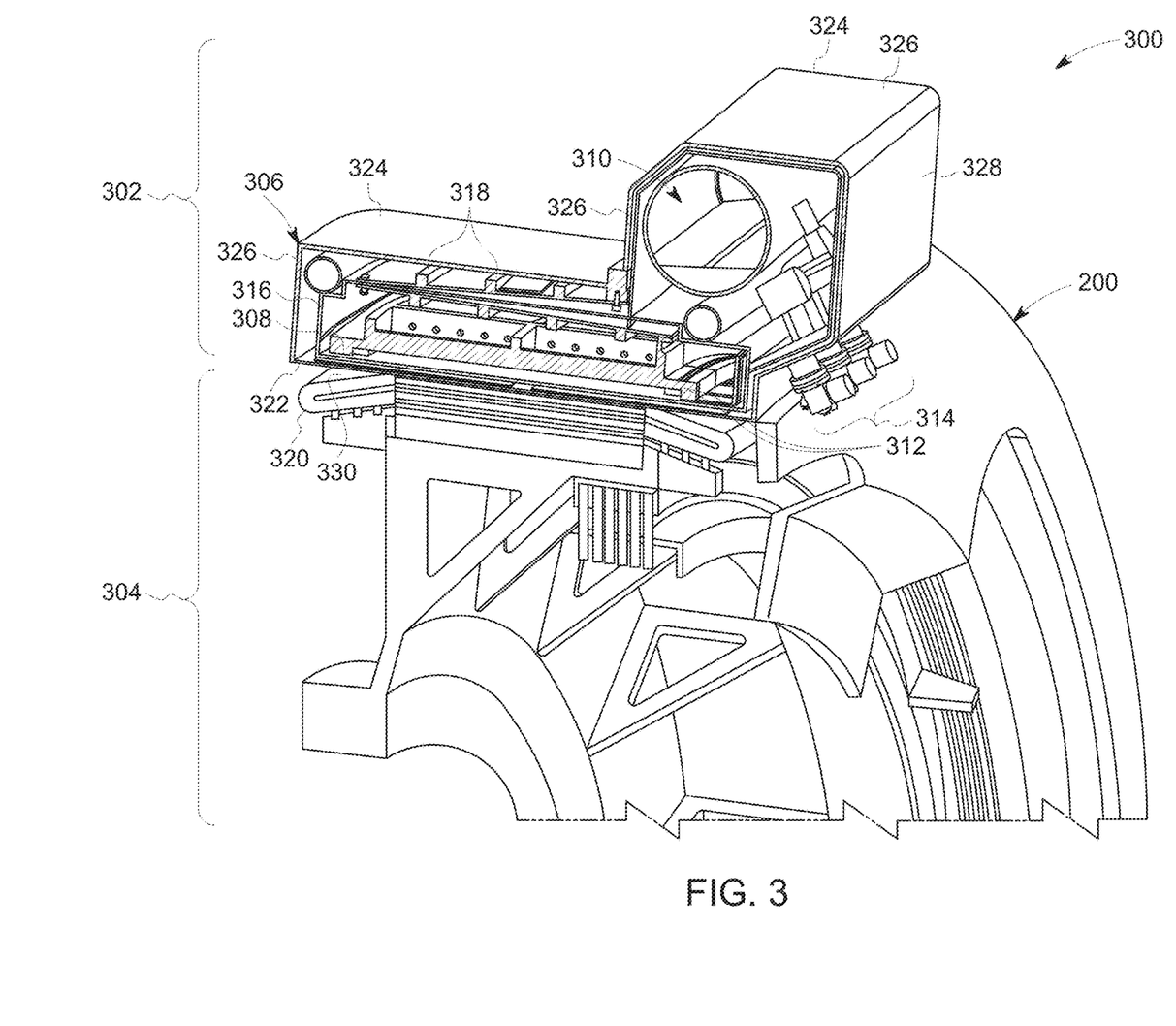
FIG. 3 is a perspective cross-sectional view of a portion of the electric machine (e.g., the superconducting generator) of FIG. 2, in accordance with one or more embodiments of the present disclosure.
Figure 4:
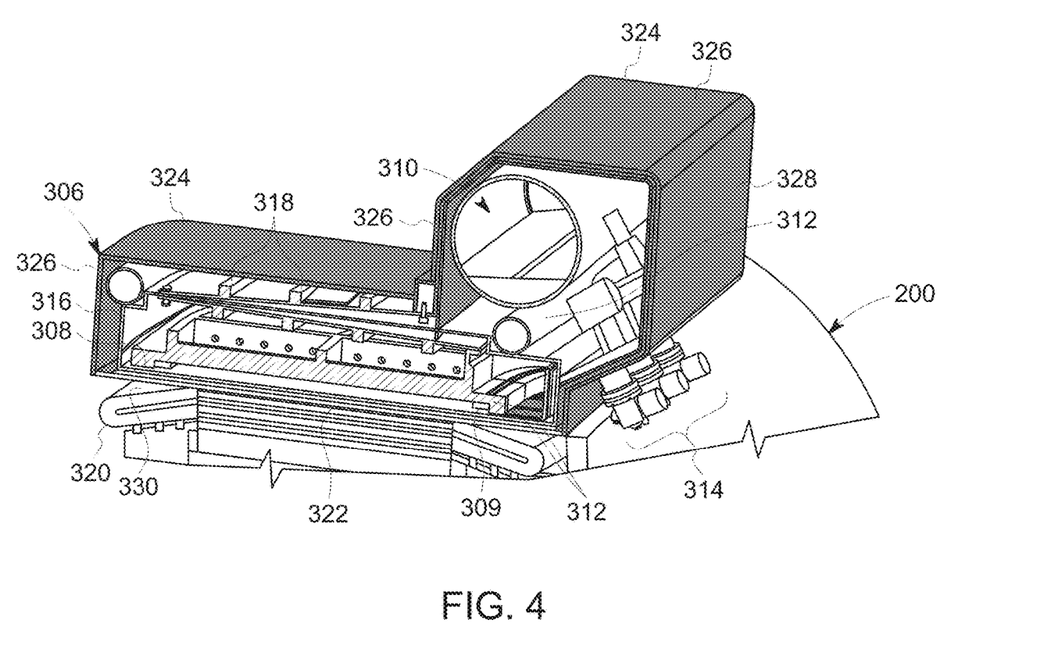
FIG. 4 is an enlarged perspective cross-sectional view of a portion of the electric machine (e.g., the superconducting generator) of FIG. 3, in accordance with one or more embodiments of the present disclosure.

Turning now to FIGS. 3 and 4, a perspective cross-sectional view 300 of a portion of the superconducting generator 200 of FIG. 2 is presented (FIG. 3) and an enlargement of a portion of FIG. 3 is presented (FIG. 4), in accordance with an embodiment of the present disclosure. The superconducting generator 200 includes a stationary field 302 (similar to the stationary field 202 of FIG. 2) and an armature 304 (similar to the armature 204 of FIG. 2). The stationary field 302 is disposed concentric to and radially outward from the armature 304 and includes a vacuum vessel 306 and at least one superconducting field winding 308. The vacuum vessel 306 forms an outer vacuum container (OVC) and is described more particularly with regard to FIG. 4.

In some embodiments, the superconducting generator 200 may also include one or more tanks 310, one or more conduits 312, a cooling apparatus 314, an optional thermal shield 316, one or more torque transfer structures 318 such as torque tubes, or combinations thereof. Moreover, the armature 304 includes an armature winding 320. In some embodiments, the armature winding 320 is non-superconducting winding. In the embodiment shown in FIG. 3, torque tubes are used as the torque transfer structures 318. Other types of torque transfer structures or torque transfer mechanisms may also be used in place of or in addition to the torque tubes, without limiting the scope of the present disclosure. In the description hereinafter, the terms "torque transfer structures" and "torque tubes" are interchangeably used.

As depicted in the perspective cross-sectional views 300 of FIGS. 3 and 4, the vacuum vessel 306 (sometimes referred to as a cryostat) is an annular, cylindrical shaped vessel that houses, either fully or partially, the superconducting field winding 308, the tank 310, the one or more conduits 312, the cooling apparatus 314, the optional thermal shield 316, and the one or more torque tubes 318. The reference numerals 322 and 324, respectively, represent an inner wall and an outer wall of the vacuum vessel 306. In some embodiments, the inner wall 322 faces the armature 304. More particularly, the stationary field 302 and the armature 304 are disposed such that the inner wall 322 of the vacuum vessel 306 is positioned radially opposite to an outer surface 330 of the armature 304. As illustrated, a portion of the outer wall 324 defines a cold box 326 in which the one or more tanks 310, the one or more conduits 312, and the cooling apparatus 314 are housed. A plurality of radially extending sidewalls 328 couple the inner wall 322 of the vacuum vessel 306 to the outer walls 324 of the vacuum vessel 306.

As illustrated in FIG. 4 by shading, in this particular embodiment, the vacuum vessel 306 is at least partially constructed of a ferromagnetic material. As illustrated, the inner wall 322 is comprised of one of a non-magnetic material or a paramagnetic material having a low magnetic permeability, typically $\mu/\mu_o$ of <7, and more particularly $\mu/\mu_o$ on the order of 1.0 to 2.0, such as a stainless steel where $\mu/\mu_o$=1.005, where to symbolizes the permeability of free space, μ symbolizes the absolute permeability of the medium, and $μ/μ_o$ symbolizes the relative permeability. The outer wall 324 and sidewalls 328 are formed of ferromagnetic material, having a magnetic permeability of approximately $μ/μ_o$~100-10,000. Suitable ferromagnetic materials for use in forming the wall 324 and sidewalls 328 of the vacuum vessel 306 include cobalt, nickel and steel, in particular, steel containing from 0.04% to 0.30% carbon, more particularly from 0.06% to 0.30% carbon. Examples of suitable steel materials include, but are not limited to, SAE-AISI 1010, SAE-AISI 1020, and ASTM A36. In yet another embodiment, in combination with the inner wall 322, only the outer wall 324 is formed of ferromagnetic material. In this embodiment, the sidewalls 328, similar to the inner wall 322, may be formed of one of a non-magnetic or a paramagnetic material, such as stainless steel.

Complete, or at least partial, construction of the vacuum vessel 306 of a mild or low carbon steel, not only provides for a more cost effective vacuum vessel 306, but additionally provides enhancement of the magnetic field near the ends 309 of the superconducting field winding 208 and provides some level of passive magnetic shielding, in combination greatly reducing overall cost of the vacuum vessel 306.

Due to ambient pressure outside, and vacuum inside, the vacuum vessel 306 is subjected to differential pressure loading. Accordingly, in some embodiments, the inner wall 322 of the vacuum vessel 306 is thinner than the outer wall 324 of the vacuum vessel 306. Radially outward forces are applied on the inner wall 322 of the vacuum vessel 306 which may load the inner wall 322 in tension. The forces on the outer wall 324 of the vacuum vessel 306 are directed in a radially inward direction, thereby loading the outer wall 324 in compression. The compressive forces may cause buckling if the outer wall 324 is not sufficiently thick. Due to the difference in direction of the radial forces between the inner wall 322 and the outer wall 324, the outer wall 324 may be designed to be thicker than the inner wall 322. In an embodiment, the inner wall 322 has a thickness of approximately 6-12 mm, the sidewalls 328 have a thickness of approximately 12-20 mm thick and the outer wall 324 has a thickness of approximately 20-25 mm thick. In an embodiment, a portion of the outer wall 324 forming the coldbox 326 has a thickness of approximately 10 mm.

Further, in some embodiments, the stationary field 302 may also include suitable arrangement for cooling and maintaining the superconducting field winding 308 at cryogenic temperatures. By way of example, such arrangement for cooling the superconducting field winding 308 may include one or more of the tanks 310, the conduits 312, and the cooling apparatus 314. The tank 310 is disposed in fluid communication with the cooling apparatus 314 and stores a cooling fluid. Although the stationary field 302 is shown as including a single tank 310, use of two or more such tanks for holding the cooling fluid is also envisioned within the scope of the present specification. Non-limiting examples of the cooling fluid may include any type of gaseous or condensed cooling fluids, for example, helium.

Furthermore, the cooling apparatus 314 may be disposed inside or outside vacuum vessel 306 and configured to cool the cooling fluid so as to maintain the superconducting field winding 308 at a temperature that is below a cryogenic temperature. At the cryogenic temperature, the material of the superconducting field winding 308 is superconducting. The appropriate temperature range for operation of the superconducting field winding 308 depends on the superconducting material selected for the superconducting field winding 308. In particular, the cooling apparatus 314 may be configured to cool the cooling fluid so as to maintain the superconducting field winding 308 at the cryogenic temperatures, for example, at about 4 Kelvin that may be appropriate for the low temperature superconducting material such as an alloy of niobium and titanium. In another non-limiting example, the cooling apparatus 314 may be configured to cool the cooling fluid so as to maintain the temperature of the superconducting field winding 308 in a range of about 4 Kelvin to about 10 Kelvin that may be appropriate for the low temperature superconducting material such as an alloy of niobium and tin. In yet another non-limiting example, the cooling apparatus 314 may be configured to cool the cooling fluid so as to maintain the temperature of the superconducting field winding 308 in a range of about 20 Kelvin to about 26 Kelvin that may be appropriate for a high temperature superconducting material such as yttrium barium copper oxide (YBCO). Moreover, in a non-limiting example, liquid helium may be used as the cooling fluid for low temperature superconductors because it has a temperature of about 5.19 Kelvin. In another non-limiting example, for the high temperature superconducting materials, hydrogen or neon may be used as the cooling fluid.

The conduits 312 may be disposed inside the vacuum vessel 306 and fluidly coupled to the tank 310. The conduits 312 may be disposed annularly inside the vacuum vessel 306. The conduits 312 are configured to facilitate flow of the cooling fluid within the stationary field 302. In particular, the cooling fluid passively circulates annularly inside the stationary field 302 through the conduits 312, driven by density gradients and phase change. While being circulated, the cooling fluid removes any heat (such as from radiation or conduction heat transfer or from eddy current heating created by generator operation) deposited onto or into a low-temperature structure of the stationary field 302 and superconducting field winding 308, thereby maintaining the superconducting field winding 308 at cryogenic temperatures.

Moreover, in some embodiments, the optional thermal shield 316 may be disposed inside the vacuum vessel 306. In some embodiments, the optional thermal shield 316 may be disposed inside the vacuum vessel 306 such that the thermal shield 316 encloses the superconducting field winding 308 and further aids in maintaining the temperature of the superconducting field winding 308 at the cryogenic temperatures.

Additionally, in some embodiments, the stationary field 302 may include one or more torque tubes 318 disposed inside the vacuum vessel 306. In some embodiments, the torque tubes 318 may be annularly disposed inside the vacuum vessel 306. By way of example, in an embodiment whereby a thermal shield 316 is included, the torque tubes 318 may be disposed adjacent to one or more walls of the thermal shield 316. In particular, while some torque tubes 318 may be disposed inside the thermal shield 316, some other torque tubes 318 may be disposed outside the thermal shield. In an embodiment, whereby the thermal shield 316 is not included, the torque tubes 318 may be disposed adjacent to one or more of the sidewalls 328 and outer walls 324 of the vacuum vessel 306.

The torque tubes 318 are configured to support a reaction torque caused due to an interaction between a magnetic field produced by the armature 304 and a magnetic field produced by the superconducting field winding 308.

Figure 5:
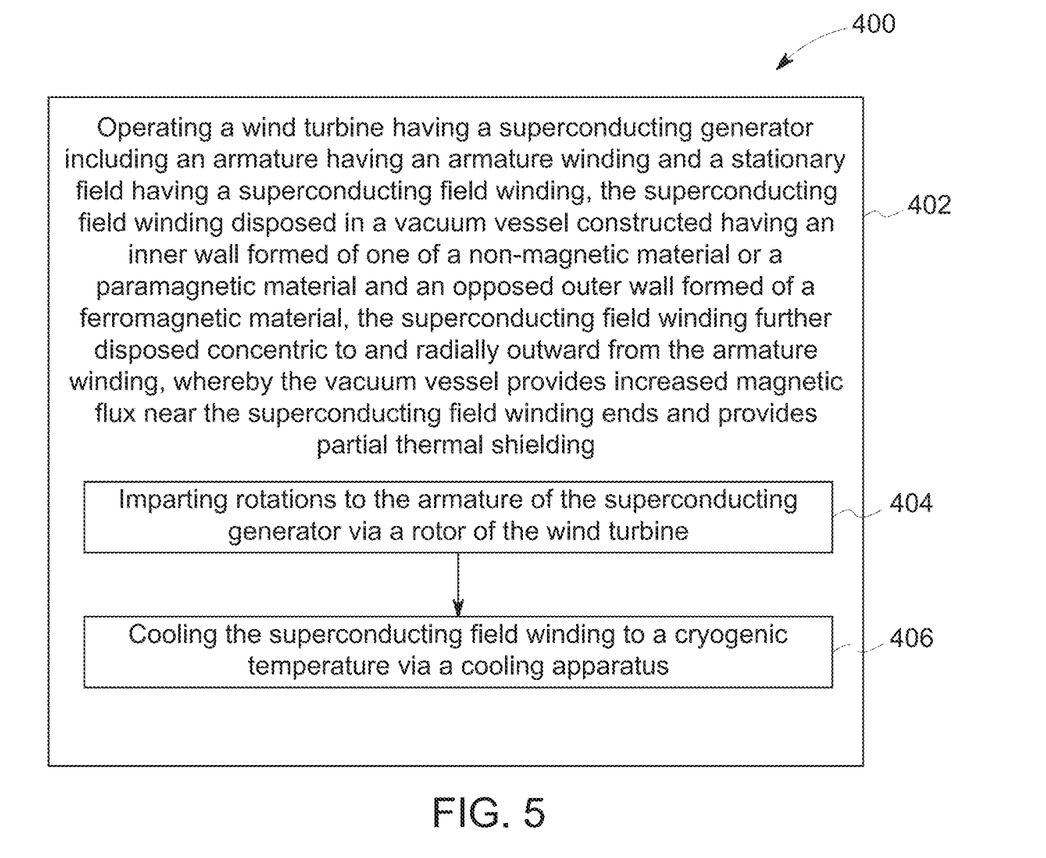
FIG. 5 is a flow diagram 400 of a method for operating the wind turbine 100 of FIG. 1, in accordance with one embodiment of the present disclosure.

Referring now to FIG. 5, a flow diagram 400 of a method for operating the wind turbine 100 of FIG. 1, in accordance with one embodiment of the present disclosure. FIG. 5 will be described in conjunction with FIGS. 1-4. The method of FIG. 5 includes, operating, at step 402, the wind turbine 100 having the superconducting generator 114, 200 including the armature 204, 304 having the armature winding 320 and the stationary field 202, 302 having the superconducting field winding 208, 308. As previously noted, the superconducting field winding 208, 308 is disposed in a vacuum vessel 306 constructed having an inner wall 322 comprised of one of a non-magnetic material or a paramagnetic material and an outer wall 324 formed of a low or mild carbon steel. The superconducting field winding 208, 308 is disposed concentric to and radially outward from the armature 204, 304.

In particular, the inclusion of the vacuum vessel 306 at least partially constructed from a mild or low carbon steel provides for a more cost effective vacuum vessel, thus reducing the overall cost of the superconducting generator. The vacuum vessel 306 further provides increased magnetic flux near the superconducting field winding ends 309 and provides partial magnetic shielding, as described previously.

The step 402 of operating the wind turbine 100 includes imparting rotations to the armature 204, 304 of the superconducting generator 114, 200 via the rotor 104 of the wind turbine 100, as indicated by step 404. The rotor 104 of the wind turbine 100 is mechanically coupled to the armature 204, 304 of the superconducting generator 114, 200 so that rotations of the rotor 104 due to the wind energy results in rotations of the armature 204, 304 of the superconducting generator 114, 200.

Further, the step 402 of operating the wind turbine 100 includes cooling the superconducting field winding 208, 308 to a cryogenic temperature via the cooling apparatus 314, as indicated by step 406. The cooling fluid such as liquid helium, hydrogen, neon, or combinations thereof, may be cooled and circulated via the cooling apparatus 314 inside the stationary field 202, 302 through one or more conduits 312 so as to maintain the superconducting field winding 208, 308 at the cryogenic temperature so that the material of the superconducting field winding 308 is superconducting.

In accordance with the embodiments described herein, an improved superconducting generator such as the superconducting generator 114, 200 and wind turbine such as the wind turbine 100 including the improved superconducting generator are provided. The improvements in the superconducting generator 114, 200 and the wind turbine 100 may be achieved, at least partially, due to the inclusion of a vacuum vessel 306 constructed as least partially of a mild or low carbon steel as disclosed herein in accordance with embodiments of the present disclosure. The inclusion of the vacuum vessel 306 as described herein provides a more cost effective vacuum about the superconducting field winding, a means for enhancing the magnet field near the ends of the field winding and passively providing some level of magnetic shielding. By forming the vacuum vessel 306 of cost effective materials, the overall cost of the superconducting generator is reduced.

In addition, due to the vacuum vessel 306 being constructed with the thinner inner wall 322 in comparison to the outer wall 324 thereof, structural loads/forces acting inside and outside the superconducting generator 114, 200 may be compensated.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. Aspects from the various embodiments described, as well as other known equivalents for each such aspects, can be mixed and matched by one of ordinary skill in the art to construct additional embodiments and techniques in accordance with principles of this application.

The invention claimed is:

1. A superconducting generator comprising:
   an armature configured to be rotated via a shaft;
   a stationary field disposed concentric to and radially outward from the armature wherein the stationary field comprises:
   a superconducting field winding; and
   a vacuum vessel comprising an inner wall facing the armature, an opposed outer wall and a plurality of sidewalls coupling the inner wall and the outer wall, wherein the superconducting field winding is disposed in the vacuum vessel,
   wherein the inner wall comprises one of a non-magnetic material or a paramagnetic material,
   wherein the opposed outer wall comprises a ferromagnetic material, and
   wherein the side walls comprise a ferromagnetic material.

2. The superconducting generator of claim 1, wherein the ferromagnetic material comprises mild carbon steel.

3. The superconducting generator of claim 2, wherein the mild carbon steel comprises between 0.04% carbon and 0.30% carbon.

4. The superconducting generator of claim 2, wherein the mild carbon steel has a magnetic permeability of $\mu/\mu_0 \sim 100\text{-}10{,}000$, where $\mu_0$=the permeability of free space, $\mu$=the absolute permeability of the medium, and $\mu/\mu_0$=the relative permeability.

5. The superconducting generator of claim 2, wherein the mild carbon steel is one of SAE-AISI 1010, SAE-AISI 1020 or ASTM A36.

6. The superconducting generator of claim 1, wherein the non-magnetic material and the paramagnetic material have a magnetic permeability of $\mu/\mu_0 \sim 1.0\text{-}2.0$, where $\mu_0$=the permeability of free space, $\mu$=the absolute permeability of the medium, and $\mu/\mu_0$=the relative permeability.

7. The superconducting generator of claim 4, wherein the non-magnetic material and the paramagnetic material comprise stainless steel.

8. The superconducting generator of claim 1, wherein the superconducting field winding is configured to generate a magnetic field oriented in a radial direction of the superconducting generator.

9. The superconducting generator of claim 1, wherein the inner wall of the vacuum vessel is thinner than the outer wall.

10. The superconducting generator of claim 1, wherein the stationary field further comprises a thermal shield disposed inside the vacuum vessel and enclosing the superconducting field winding.

11. A wind turbine, comprising:
    a rotor comprising a plurality of blades;
    a shaft coupled to the rotor; and
    a superconducting generator coupled to the rotor via the shaft, wherein the superconducting generator comprises:

an armature configured to be rotated via the shaft;

a stationary field disposed concentric to and radially outward from the armature wherein the stationary field comprises:

a superconducting field winding; and a vacuum vessel comprising an inner wall comprised of one of a non-magnetic material or a paramagnetic material facing the armature, an opposed outer wall comprised of a ferromagnetic material and a plurality of sidewalls comprised of a ferromagnetic material and coupling the inner wall and the opposed outer wall, wherein the superconducting field winding is disposed in the vacuum vessel.

12. The wind turbine of claim 11, wherein the ferromagnetic material comprises mild carbon steel.

13. The wind turbine of claim 12, wherein the mild carbon steel has a magnetic permeability of $\mu/\mu_0 \sim 100\text{-}10{,}000$, where $\mu_0$=the permeability of free space, $\mu$=the absolute permeability of the medium, and $\mu/\mu_0$=the relative permeability.

14. The wind turbine of claim 13, wherein the mild carbon steel is one of SAE-AISI 1010, SAE-AISI 1020 or ASTM A36.

15. The wind turbine of claim 11, wherein the non-magnetic material and the paramagnetic material have a magnetic permeability of $\mu/\mu_0 \sim 1.0\text{-}2.0$, where $\mu_0$=the permeability of free space, $\mu$=the absolute permeability of the medium, and $\mu/\mu_0$=the relative permeability.

16. The wind turbine of claim 15, wherein the non-magnetic material and the paramagnetic material comprise stainless steel.

17. The wind turbine of claim 11, wherein the inner wall is thinner than the outer wall.

18. A method comprising:

operating a wind turbine having a superconducting generator comprising an armature having an armature winding and a stationary field having a superconducting field winding, the superconducting field winding disposed in a vacuum vessel constructed having an inner wall comprised of one of a non-magnetic material or a paramagnetic material and an opposed outer wall comprised of a ferromagnetic material, and a plurality of sidewalls comprised of a ferromagnetic material and coupling the inner wall and the opposed outer wall, the superconducting field winding further disposed concentric to and radially outward from the armature winding, whereby the vacuum vessel provides increased magnetic flux near the superconducting field winding ends and provides partial magnetic shielding.

19. The method of claim 18, wherein the ferromagnetic material comprises mild carbon steel.

20. The method of claim 18, wherein operating the wind turbine comprises imparting rotations to the armature of the superconducting generator via a rotor of the wind turbine.

* * * * *